Patented Jan. 9, 1934

1,942,889

UNITED STATES PATENT OFFICE 1,942,889

PROCESS OF PERFORMING ENDOTHERMIC GAS REACTIONS

Thomas Sherlock Wheeler and David Binnie, Northwich, England, assignors to Imperial Chemical Industries Ltd., a corporation of Great Britain No Drawing. Application February 16, 1931, Serial No. 516,823, and in Great Britain February 26, 1930

1 Claim. (Cl. 260—170)

This invention relates to a process of performing endothermic gas reactions and especially to the production of unsaturated gaseous hydrocarbons, in particular of acetylene, by thermal treatment of methane or gases containing methane or other members of the paraffin hydrocarbon series, olefines, and related compounds.

It has already been proposed to perform endothermic and exothermic reactions simultaneously since a suggestion has been made to moderate the temperature in an exothermic reaction by superimposing an endothermic reaction thereon. There is however an essential difference between such a proposal and the present invention. When the reaction is exothermic, high space velocities are not usually employed and apparatus of large dimensions can be used, if the interior is adequately cooled, since there is no objection to losses of heat by radiation from the outside of the apparatus. In endothermic reactions, which must be conducted at very high temperatures, it is desirable to employ small apparatus which can be insulated efficiently. However, it is very difficult to introduce the enormous quantities of heat required if the small size of the apparatus is to be offset by using very high space velocities which often possess important advantages. For example, the use of high space velocities preclude reactions which might otherwise occur at high temperatures. The present invention allows of the use of very high space velocities with their attendant advantages and yet overcomes the great difficulty of supplying the large quantity of heat required under such conditions.

This invention therefore has as an object to overcome the above mentioned difficulties of the prior art. A further object is to provide an improved process for carrying out endothermic gas reactions for the simultaneous production of unsaturated hydrocarbons and hydrochloric acid. It is another object to provide the process of carrying out an endothermic gas reaction in which a high space velocity of gas may be employed with its resultant advantages while at the same time supplying the requisite amount of heat. It is a specific object to provide an autothermic process for the production of acetylene.

These objects are accomplished by the following invention which in one of its preferred forms comprises (1) carrying out an exothermic reaction, such as the formation of hydrochloric acid from gaseous hydrogen and chlorine in a suitable apparatus, and (2) introducing into the zone of reaction with either the hydrogen or chlorine, methane gas at very high velocity, whereby it is converted into acetylene simultaneously with the formation of the hydrochloric acid gas. The exit gases are cooled rapidly and the acetylene separated in a suitable manner. The hydrochloric acid is washed out and the residual gas is found to be rich in acetylene.

The essential and novel features of our invention are that the energy for the carrying out of endothermic reaction is derived from the simultaneous exothermic reaction and that both reactions are carried out at high temperatures and very high space velocity.

In the following example we have set forth several of the preferred embodiments of our invention but they are included only for purposes of illustration and not as a limitation.

In one method of carrying out the process, chlorine, and a mixture of methane and hydrogen in which hydrogen is in excess, are led separately into a reaction chamber comprising a long narrow tube, preferably slightly constricted at or just after the point where the reaction gases meet, to insure thorough mixing. The tube is heated at this portion, or the reacting gases separately preheated to start the reaction. Usually no additional heat is then required to carry out the reaction. The speeds of reaction employed may be very high. For example, we may cause 20 liters per minute of hydrogen to react with about 20 liters per minute of chlorine, using a reaction tube of 0.25 cms. internal diameter. From these figures, it follows that space velocity is expressed by the formula $$\frac{40,000 \times 64}{3.14159} = 814,000 \text{ cm.}$$

per minute. Practically complete conversion of hydrogen and chlorine to hydrochloric acid takes place while simultaneously methane is converted to acetylene.

Example 5.5 liters of hydrogen mixed with 1.5 liters of methane are caused to pass per minute through a silica tube .5 cm. internal diameter and caused to combine with 5.5 liters per minute of chlorine. It follows, from the formula $$\frac{12,500 \times 16}{3.14159}$$

that the space velocity in this instance would be 63,600 cm. per minute. Once started, the reaction is autothermic. The exit gas, washed free of hydrochloric acid, contains 10% of acetylene.

We may in some cases, if initial conversion of hydrogen and chlorine is not complete, and such complete conversion is desired, accomplish this by supplementary heating of a portion of the reaction tube some distance beyond the reaction zone proper. In either case, when the hydrochloric acid gas formed is washed out of the exit gases, the residual gas is found to be very rich in acetylene.

Although not absolutely necessary, it is desirable to use more or less equivalent quantities of hydrogen and chlorine.

The particular advantage to be obtained from the use of this process is that the use of the simultaneous exothermic reaction makes possible the supplying of the enormous quantity of heat required for the endothermic formation of the unsaturated compound and the use of high velocities of reactants preclude deterioration of the product by secondary reactions, such as the formation of ethylene, ethane, benzene, and other compounds.

As many apparent and widely different embodiments of this invention may be made without departing from the spirit thereof, it is to be understood that we do not limit ourselves to the foregoing examples or description except as indicated in the following claim.

We claim:

The process of forming acetylene by the pyrolysis of methane which comprises passing a mixture of methane, hydrogen and chlorine through a reaction tube at a minimum velocity of about 64,000 centimeters per minute and at a high temperature, said high temperature being obtained by the exothermic formation of hydrochloric acid in the same gas mixture.

THOMAS SHERLOCK WHEELER.
DAVID BINNIE.